Feb. 16, 1965 E. A. STROMBERG 3,169,653
LOADER-CARRIER FOR AUTOMOBILES
Filed Nov. 19, 1962
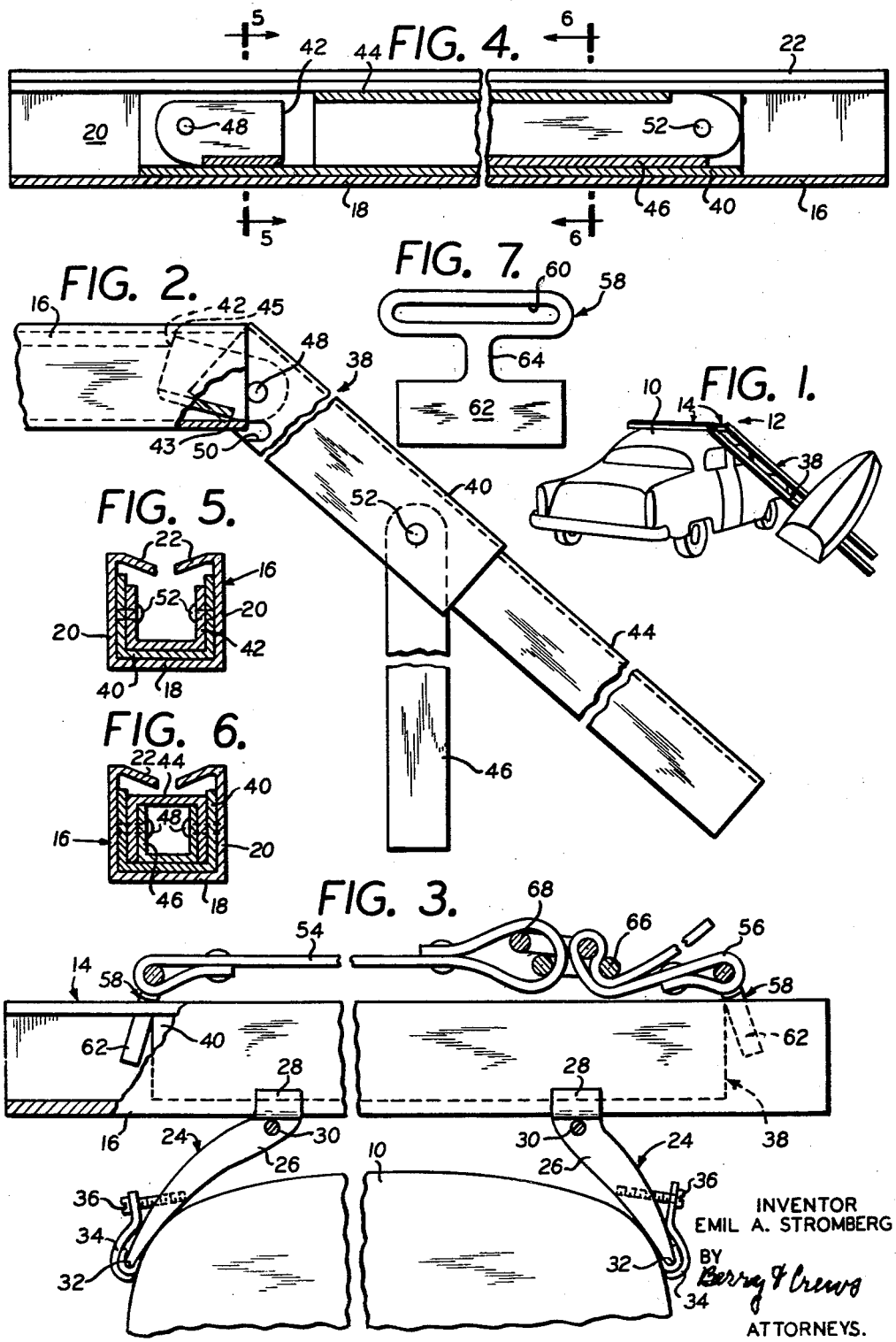
INVENTOR
EMIL A. STROMBERG
BY
Berry & Crews
ATTORNEYS.

United States Patent Office 3,169,653
Patented Feb. 16, 1965

3,169,653
LOADER-CARRIER FOR AUTOMOBILES
Emil A. Stromberg, 3451 Grant Road,
Central Point, Oreg.
Filed Nov. 19, 1962, Ser. No. 238,673
7 Claims. (Cl. 214—450)

This invention relates to a combined car top loader and bar type carrier having, without modification, all the capabilities of conventional car top luggage carriers of the bar type, but uniquely characterized by two simple and inexpensive, complete, independent ramp units normally folded and confined completely within the respective carrier bars, but capable of being withdrawn completely from the loaded or unlodaed carrier, unfolded and erected, without the addition of any extraneous parts, to form with the bars continuously smooth and unobstructed slideways for sliding an inverted boat upward from the ground alongside the car and directly into the position of stable support in which it is to be carried by the carrier, independently of the loader on the car top.

The loader-carrier of the present invention, in its most practical and advantageous form, is characterized by the following features, among others:

(1) The carrier cross bars, desirably equal in length, can be independently mounted on the car top in coplanar, parallel, coterminous relation, and the independent ramp units can be erected in association with the cross bars at the right side or the left side of the car, as local conditions may require;

(2) Flexible tie devices, cooperative with the fixed carrier cross bars, serve to secure the ramp units completely within the carrier cross bars whether a boat is present on the carrier or not, and if a boat is present they serve also to secure the boat firmly in place;

(3) Whether mounted on the car with a boat on top, mounted on a car without any load on it, or simply stored in a garage, the combined loader and carrier is composed of two essentially identical three part assemblies, each consisting of a cross bar carrier unit, an independent ramp unit housed within the associated cross bar unit, and a flexible tie device maintaining the cross bar unit and the ramp unit in association with one another and with itself. There are no additional parts to become mislaid;

(4) Each of the unloaded assemblies can be removed from, and restored to, the car top without disturbing the organized relationship of its three component parts;

(5) Because the boat is loaded and unloaded by simple sliding action there is no need during either operation to hold the boat on an incline with one hand while assembling or disassembling auxiliary equipment with the other, nor is there ever any occasion to change the position of the ramp while the boat is supported on it;

(6) The withdrawal and erection of the ramp units, the loading or unloading of the boat, and the restoration of the ramp units to folded and stored condition can be effected quickly and with the utmost simplicity, by a single operator.

Other objects and advantages will hereinafter appear.

In the drawing forming part of this specification,

FIGURE 1 is a perspective view showing a practical and advantageous, illustrative loader-carrier in operative association with an automobile and a boat;

FIGURE 2 is a fragmentary view in elevation, broken away intermediate the ends for compactness, and further broken away to reveal interior structure, the view showing one of the ramp units operatively associated with an end of one of the cross bars;

FIGURE 3 is a fragmentary view in elevation, partly broken away, showing the loader-carrier on the top of a vehicle as it would appear when the carrier is not loaded;

FIGURE 4 is a sectional view showing one of the cross bars with the associated but independent ramp unit folded and stored inside it;

FIGURE 5 is a sectional view taken upon the line 5—5 of FIGURE 4, looking in the direction of the arrows;

FIGURE 6 is a sectional view taken upon the line 6—6 of FIGURE 4, looking in the direction of the arrows; and FIGURE 7 is a detailed view showing one of the strap end anchor members.

As seen in FIGURE 1, the body 10 of a closed passenger car carries upon it a carrier 12 of the bar type. The carrier consists of front and rear identical units 14, one of which is illustrated in FIGURE 3. Each bar unit comprises a hollow bar member 16 which is formed as a channel member (see FIGURES 5 and 6) of essentially rectangular cross-section.

Each bar includes a continuous bottom wall 18, side walls 20 and inturned upper flanges 22, which extend into proximity with one another, so that the bar is essentially tubular in form. The upper flanges 22 extend inward toward one another but they are sloped downward in order to avoid objectionable sonic effects, such as whistling or roaring, found at high speeds to occur when the flanges simply extend in horizontally toward one another. The flanges 22 do not extend into meeting relation but leave a space or slot of uniform width which is open from end to end of the bar.

The bar 16 is clamped in a pair of supporting brackets 24. Each bracket 24 includes a channel member 26 which has upstanding side wall extensions or ears 28 at its upper end, so spaced from one another that the bar 16 is adapted to fit snugly between them. A headed bolt 30 has its body passed through one of the side walls of the member 26 and threaded into the opposite side wall. When the bolt 30 is backed off the bar 16 is free to be slid between the ears 28 and relative to the member 26, but when a desired relationship is obtained the bolt may be tightened to draw the ears toward one another, thereby to clamp the ears 28 against the bar 16 and fix the bar securely in place.

The member 26 rests at its lower end in the conventional drip trough 32 of the vehicle. Each bracket also includes a hook 34 which hooks around the lower side of the drip trough and which includes an upstanding arm that extends well above the drip trough. A headed screw 36 passes freely through the upper end of the hook 34 and is threaded into the channel member 26 for clamping the drip trough securely and fixedly between the hook 34 and the channel member 26.

Since the car body is generally narrower at its forward end than it is farther back, the brackets 24 of the rear carrier unit require to be adjusted at a greater distance from one another than the corresponding brackets of the forward unit. Thus, although all the parts of the forward unit are identical with the corresponding parts of the rear unit, one of the units, as a matter of convenience, becomes characteristically the forward unit and the other the rear unit once the brackets have been applied to the bars.

The bars of the two units are of equal lengths, and they may be made long enough to extend out somewhat beyond the trough but not beyond the extreme side boundaries of the vehicle. In this way a broader base is made available for the boat, if required. When mounted upon the vehicle, the bars extend in coplanar, parallel relation and are desirably coterminous with one another. By making the bars of equal length and arranging them to be coterminous a carrier is provided which can cooperate with ramp units 38 whether the ramp units be erected at the right side of the vehicle or at the left side of the vehicle.

The ramp units 38 are shown in erected positions in FIGURE 1. As best seen in FIGURE 2, each ramp unit comprises a principal channel member 40, an upper, foldable extension in the form of a second channel member 42, a lower foldable extension member in the form of a third channel member 44, and a foldable prop in the form of a fourth channel member 46. The channel member 40 has its base disposed upward as seen in FIGURE 2, the open side of the channel facing downward. The channeled member 40 is narrow enough to be received snugly but slidably within the associated bar 16.

A hinge pin 48, mounted in the side walls of the bar 40, forms a pivot upon which the extension member 42 is mounted. The ends of the side walls of the member 42 are rounded so that the extension member 42 can be turned to dispose it within the cross bar 16 when the ramp unit is erected. The member 42 serves accurately to locate and to maintain the upper face of the channel member 40 substantially in contact with the upper face of the cross bar 16. The side walls of the channel member 40 are formed with notches 50 in order to provide clearance for the lower wall of member 40, as seen in FIG. 2. The notches 50 permit sufficient penetration of the member 40 into the carrier member 16 to hold the upper end of the member 40 against fore and aft shifting. The tendency is for the ramp to be pressed toward the cross bar as the boat is being raised or lowered, so that no positive locking against separation is required. The extension 42 does, however, serve to locate the ramp unit vertically and transversely in the position of FIG. 2, and to secure the unit against accidental dislodgement from that position. The notches 50 are wide enough to permit the weight of the upper end of the ramp unit to be borne by an edge 43 of the extension member 42. This tends to rock the member 42 clockwise about the axis of pivot pin 48, but such rocking is limited by engagement of an edge 45 of the member 42 with the upper, inturned flanges 22 of the bar 16. When a load is applied to the ramp unit, the edge 43 is pressed with increased force against the bottom wall of the bar 16, being caused to dig into the wall, and thus to hold the ramp unit dependably in place. Upon removal of the load, the ramp unit is free to be withdrawn. The member 40 is first lifted slightly to rock the member 42 counterclockwise, and then pulled horizontally to a free condition.

A pivot pin 52 is mounted in the side walls of the member 40 near the lower ends thereof and passes through the side walls of the channel members 44 and 46, serving as a pivotal support for both of the latter members. The member 44 may be turned outward to form a direct, ground engaging extension of the member 40, while the channel member 46 can be turned into a vertical position, as shown, to reinforce the ramp at the joint.

The ramp member 40 is made shorter than the cross bar 16 and is adapted to be received and carried within the cross bar 16. The member 40 is, however, longer than the combined lengths of the extension members 42 and 44. When the ramp unit is to be placed within a cross bar, the extension member 42 is folded inward, as best seen in FIGURES 4 and 5, so that it lies completely within the bounds of the ramp member 40. The channel member 46 is folded inside the extension member 44 and the members 44 and 46 are then folded together into the member 40, as shown in FIGURES 4 and 6.

In FIGURE 3 a carrier unit is shown mounted on the car with each carrier cross bar containing one of the folded ramp units. A flexible tie device is provided for maintaining the ramp unit in place within the cross bar. As illustrated, the tie device comprises two straps 54 and 56. Anchor devices 58 (FIGURE 7) are provided at the ends of the respective straps. A strap end is passed through a slot or eye 60 formed in an eye portion of the associated anchor member, is folded upon itself and riveted.

Each anchor member further includes a body portion 62 which is connected to the eye portion through a narrow neck 64. The neck 64 is narrow enough to be inserted into, and to slide along, the slot formed between the flanges 22 of the cross bar, so that the body portions of the anchor members will lie within the cross bar while the eye portions of the anchor members lie above the cross bar. The straps 54 and 56 are adapted to be connected with one another in any suitable manner to form a flexible, contractable tie. As shown, the free end of the strap 54 is passed successively through square rings 66 and 68, folded onto itself and riveted. The strap 56 may be associated with the rings 66 and 68 as illustrated to complete the tie. The free end of the strap 56 may be drawn to tension the tie device and the snubbing effect of the rings 66 and 68 upon the strap 56 will retain the device under tension and without slipping.

When the tie device has been put under tension, the body portions 62 bear against the opposite ends of the enclosed ramp member 40, limiting approach of the anchor members towards one another. The anchor members are thus tilted inward by strap tension, causing the body portions of the anchor members to bind against the lower faces of the flanges 22 and the eye portions to bind against the upper faces of the flanges, so that the ramp unit and the tie device are held immovably in place.

As shown in FIGURE 3, the tie device is simply holding the ramp unit in fixed relation to the associated cross bar unit, so that a three part assembly is maintained. Front and rear assemblies of this kind are maintained when there is no load on the carrier, or when the carrier is removed from the car top and stored. When a boat has been put in place on top of the car, the flexible tie devices are passed around the boat, serving additionally for securing the boat fixedly in place upon the carrier.

When a boat is to be put up onto the carrier from the ground each flexible tie device is relaxed, extended, and removed temporarily from the associated cross bar. The ramp units are then withdrawn from within the cross bar, and are unfolded and erected as illustrated in FIGURES 1 and 2. The two ramp units extend from the cross bars down to the ground at one side of the vehicle at an inclination of not substantially more than 45°. The boat is now brought to the lower end of the ramp, and is placed upside down on the lower ends of the ramp units with the center of mass of the boat disposed substantially midway between the two ramp units. The boat may then be slid upward and onto the carrier into a position of stable support without interruption by a single operator.

Once the boat is stably in place upon the carrier, it may be left there while the ramp units are folded and reinserted in the associated cross bars. The tie members are then applied one after the other. In this instance, the anchor member at the end of the strap 56 is inserted first into the slot of the cross bar and the strap is thrown over the boat. The anchor member of the strap 54 is then inserted and the tie is formed between the straps as before. The anchor members may or may not engage the opposite ends of the ramp member 40 depending upon the width of the boat, but in any case the boat is held securely in fixed position for transportation, and each ramp unit is confined in a cross bar between a pair of the anchor members 62.

The parts of the novel loader-carrier are few and simple, so that the structure is inexpensive and is easy to understand and to manage.

The parts of each three part assembly are always maintained in association with one another, there being no danger of parts being lost or mislaid.

The loading and unloading operations, including the ramp erection and ramp storing operations, are simple and fast, and are well within the capability of a single operator.

I have described what I believe to be the best embodiments of my invention. I do not wish, however, to be confined to the embodiments shown, but what I desire to cover by Letters Patent is set forth in the appended claims.

I claim:

1. A car top loader and carrier for enabling an inverted boat to be raised from the ground onto the top of a car by a continuous sliding movement, and there stably supported, comprising, in combination, a normally fixed platform type carrier which comprises straight front and rear transverse, parallel, tubular bars of uniform cross-section, free from obstructing external protuberances and continuously open interiorly from end to end, and each having a top wall which is slotted from the ends inward for at least substantial distances; and complete, ramp units, independent of the carrier bars, composed of foldable and nestable sections, and insertable when folded, into the respective carrier bars, and normally carried, concealed and completely confined within the carrier bars, but adapted when unfolded and erected to form independently mounted, straight, continuously smooth, stationary slideways of appropriate lengths to join the carrier bars to the ground at an inclination of not substantially more than 45°, each ramp unit consisting of a principal, channeled bar member, a lower extension bar member permanently hingedly connected to the principal ramp member, and nestable within the principal ramp member, and means forming an inseparable pivotal extension of the ramp unit for temporarily connecting the principal ramp member to the carrier bar and retaining the principal ramp member in position to assure a smooth transition joint between the upper faces of the erected ramp unit and the associated carrier bar, the folded ramp unit being substantially shorter than the associated carrier bar.

2. A car top loader and carrier as set forth in claim 1 in which the upper, slot-bordering upper wall portions of the transverse bars are depressed within the bar boundaries sufficiently to avoid objectionable sonic effects when high relative speeds of the car and the surrounding air occurs.

3. A car top loader and carrier for enabling an inverted boat to be raised from the ground onto the top of a car by a continuous sliding movement, and there supported, comprising, in combination, a fixed carrier composed of distinct front and rear transverse bar units, each consisting of a hollow bar of uniform cross-section, free from obstructing external protuberances, and continuously open interiorly from end to end, and having a top wall thereof slotted from the ends inward for at least substantial distances, and a pair of supporting brackets on which the bar is secured with capacity for endwise adjustment and by which the unit is detachably secured to the car top through utilization of the conventional car top drip trough, the construction and arrangement being such that the carrier bars may be mounted at any desired distance from one another in coplanar, parallel, coterminous relation; and complete, foldable ramp units normally carried and completely confined within the respective carrier bars, but adapted when unfolded to form independently mounted, straight, continuously smooth, stationary slideways of appropriate lengths to join the carrier bars to the ground at an inclination of not substantially more than 45°, each ramp unit consisting of a principal, channeled bar member and upper and lower extension bar members permanently hingedly connected to opposite ends of the principal ramp member and nestable within the principal ramp member, the upper extensions, when unfolded, being insertable in the associated carrier bar and serving to assure the securement and maintenance of a smooth transition joint between the upper faces of the principal ramp member and the associated carrier bar, and the lower extension member serving as a lower leg joint of the ramp unit, the principal ramp member being substantially shorter than the associated carrier bar but longer than the combined lengths of the ramp extension members.

4. A car top loader and carrier for enabling an inverted boat to be raised from the ground onto the top of a car by a continuous sliding movement, and there supported, comprising, in combination, a normally fixed platform type carrier having front and rear transverse, parallel hollow bars of uniform cross-section, free from obstructing external protuberances and continuously open interiorly from end to end, and each having a top wall thereof slotted from the ends inward for at least substantial distances; complete, foldable ramp units normally carried and completely confined within the respective carrier bars but adapted when unfolded and erected to form independently mounted, straight, continuously smooth, stationary slideways of appropriate lengths to join the carrier bars to the ground at an inclination of not substantially more than 45°, each ramp unit consisting of a principal, channeled bar member, a lower extension bar member permanently hingedly connected to the principal ramp member and nestable within the principal ramp member, and means for temporarily connecting the principal ramp member to the carrier bar in position to assure a smooth transition joint between the upper faces of the erected ramp unit and the associated carrier bar, the folded ramp unit being substantially shorter than the associated carrier bar; adjustable, flexible tie units adapted for association with the respective carrier bars for holding the boat in place and/or confining the ramp units within the carrier bars, each tie unit including anchoring devices at its opposite ends, each anchoring device having an eye portion, a substantial body portion, and a narrow neck portion through which the eye and body portions are connected to one another, the neck portions being adapted to pass through, and to slide along, slotted portions of the associated carrier bar, and the body portions of the anchoring devices within the carrier bar serving both to anchor the tie unit against separation from the carrier bar and to limit endwise movement of the folded ramp unit contained within the carrier bar.

5. A car top loader and carrier for enabling an inverted boat to be raised from the ground onto the top of a car by a continuous sliding movement, and there supported, comprising, in combination, a normally fixed carrier composed of distinct front and rear transverse bar units, each consisting of a hollow bar of uniform cross-section, free from obstructing external protuberances and continuously open interiorly from end to end, and having the top wall thereof slotted from the ends inward for at least substantial distances, and a pair of supporting brackets on which the bar is secured with capacity for endwise adjustment and by which the unit is detachably secured to the car top through utilization of the conventional car top drip trough, the construction and arrangement being such that the carrier bars may be mounted at any desired distance from one another in coplanar, parallel, coterminous relation; complete, foldable ramp units normally carried by, and completely confined within, the respective carrier bars, but adapted when withdrawn and unfolded to form independently mounted, straight, continuously smooth, stationary slideways of appropriate lengths to join the carrier bars to the ground at an inclination of not substantially more than 45°, each ramp unit consisting of a principal, channeled bar member, a lower extension bar member permanently hingedly connected to the principal ramp member and nestable within the principal ramp member, and means for connecting the principal ramp member to the carrier bar in position to assure a smooth transition joint between the upper faces of the erected ramp unit and the associated carrier bar, the folded ramp unit being substantially shorter than the carrier bar; and adjustable, flexible tie units adapted for association with the respective carrier bars for holding the boat in place and confining the ramp units within the carrier bars, each tie unit including an anchoring device at each of its opposite ends, and each anchoring device having an eye portion, a substantial body portion, and a narrow neck portion through which the eye and body portions are connected to one another, the neck portions being adapted to pass through, and to slide along, slot portions of the associated carrier bar, and the body portions of the anchoring devices within the carrier bar serving both to anchor the tie unit against separation from the carrier bar and to confine the folded ramp unit within the carrier bar.

6. A car top loader and carrier for enabling an inverted boat to be raised from the ground onto the top of a car by a continuous sliding movement, and there supported, comprising, in combination, a normally fixed carrier composed of distinct front and rear transverse bar units, each consisting of a hollow bar of uniform cross-section, free from obstructing external protuberances and continuously open interiorly from end to end, and having the top wall thereof slotted from the ends inward for at least substantial distances, and a pair of supporting brackets on which the bar is secured with capacity for endwise adjustmtnt and by which the unit is detachably secured to the car top through utilization of the conventional car top drip trough, the construction and arrangement being such that the carrier bars may be mounted at any desired distance from one another in coplanar, parallel, coterminous relation; complete, foldable ramp units normally carried by, and completely confined within, the respective carrier bars, but adapted when unfolded to form independently mounted, straight, continuously smooth, stationary slideways of appropriate lengths to join the carrier bars to the ground at an inclination of not substantially more than 45°, each ramp unit including a principal channeled bar member and upper and lower extension bar members hingedly connected to opposite ends of the principal ramp member and nestable within the principal ramp member, the upper extension, when unfolded, being insertable in the associated carrier bar and serving to assure a smooth transition joint between the upper faces of the erected ramp unit and the associated carrier bar, and the lower extension member serving as a lower leg joint of the ramp unit, the principal ramp member being substantially shorter than the associated carrier bar but longer than the combined lengths of the ramp extension members; and adjustable, flexible tie units adapted for association with the respective carrier bars for holding the boat in place and/or confining the ramp units within the carrier bars, each tie unit including an anchoring device at each of its opposite ends, and each anchoring device having an eye portion, a substantial body portion, and a narrow neck portion through which the eye and body portions are connected to one another, the neck portions being adapted to pass through, and to slide along slot portions of the associated carrier bar, and the body portions of the anchoring devices within the carrier bar serving both to anchor the tie unit against separation from the carrier bar and to limit endwise movement of the folded ramp unit contained within the carrier bar.

7. A car top loader and carrier as set forth in claim 6 in which each ramp unit further includes a bracing leg nestable in the lower extension member and hingedly connected to the principal ramp member about a common pivot with the lower extension member.

References Cited by the Examiner
UNITED STATES PATENTS

| | | | |
|---|---|---|---|
| 860,752 | 7/07 | Leach | 214—85 |
| 2,551,351 | 5/51 | Swenson | 214—450 |
| 2,611,466 | 9/52 | Biggert et al. | |
| 2,849,135 | 8/58 | Embler | 214—450 |

HUGO O. SCHULZ, *Primary Examiner.*

UNITED STATES PATENT OFFICE
CERTIFICATE OF CORRECTION

Patent No. 3,169,653                        February 16, 1965

Emil A. Stromberg

It is hereby certified that error appears in the above numbered patent requiring correction and that the said Letters Patent should read as corrected below.

Column 5, line 39, for "occurs" read -- occur --; line 67, for "extensions" read -- extension --; column 7, line 20, for "adjustmtnt" read -- adjustment --.

Signed and sealed this 13th day of July 1965.

(SEAL)
Attest:

ERNEST W. SWIDER
Attesting Officer

EDWARD J. BRENNER
Commissioner of Patents